US012576817B2

(12) United States Patent
Salter et al.

(10) Patent No.: US 12,576,817 B2
(45) Date of Patent: Mar. 17, 2026

(54) GRILL SHUTTER CONTROL FOR BRAKE COOLING

(71) Applicant: FORD GLOBAL TECHNOLOGIES, LLC, Dearborn, MI (US)

(72) Inventors: Stuart C. Salter, White Lake, MI (US); Jeff Robert Seaman, Petersburg, MI (US); Annette Lynn Huebner, Highland, MI (US); Kenneth Patrick Mchugh, Canton, MI (US); Andrew Stoscup, Wixom, MI (US); Brendan Diamond, Grosse Pointe, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 280 days.

(21) Appl. No.: 18/231,930

(22) Filed: Aug. 9, 2023

(65) Prior Publication Data

US 2025/0050842 A1     Feb. 13, 2025

(51) Int. Cl.
B60T 5/00      (2006.01)
B60T 17/22     (2006.01)
F16D 65/847    (2006.01)

(52) U.S. Cl.
CPC .............. B60T 5/00 (2013.01); B60T 17/221 (2013.01); F16D 65/847 (2013.01)

(58) Field of Classification Search
CPC .......... B60T 5/00; B60T 17/22; F16D 65/847
See application file for complete search history.

(56) References Cited

U.S. PATENT DOCUMENTS

| | | | |
|---|---|---|---|
| 8,439,276 B2 | 5/2013 | Prior | |
| 8,631,889 B2 | 1/2014 | Begleiter et al. | |
| 8,731,782 B2 | 5/2014 | Kerns | |
| 9,004,241 B2 * | 4/2015 | Browne | F16D 65/847 |
| | | | 188/71.6 |
| 9,409,474 B2 | 8/2016 | Macfarlane et al. | |
| 9,878,609 B2 | 1/2018 | Dudar | |
| 9,976,473 B2 | 5/2018 | Glugla et al. | |

(Continued)

FOREIGN PATENT DOCUMENTS

| | | |
|---|---|---|
| CN | 104675501 A | 6/2015 |
| CN | 104675502 A | 6/2015 |

(Continued)

OTHER PUBLICATIONS

Marshall, et al., Thermal Management of Vehicle Cabins, External Surfaces, and Onboard Electronics: An Overview, Elsevier, Research Vehicle Engineering—Review, Jun. 1, 2019, p. 954-969, Elsevier LTD on behalf of Chinese Academy of Engineering and Higher Education Press Limited Company, US.

*Primary Examiner* — George C Jin
(74) *Attorney, Agent, or Firm* — Burr & Forman; Lorne Forsythe

(57) ABSTRACT

A vehicle control system for a vehicle may include a brake assembly for applying negative torque to one or more wheels of the vehicle, a grill shutter assembly that directs airflow over the brake assembly when opened, and prevents airflow toward the brake assembly when closed, and a controller that calculates a target brake temperature, the controller being operably coupled to the grill shutter assembly to control positioning of the grill shutter assembly based on a comparison between a current brake temperature to the target brake temperature.

19 Claims, 5 Drawing Sheets

(56) References Cited

U.S. PATENT DOCUMENTS

| | | | |
|---|---|---|---|
| 10,167,915 B2 | 1/2019 | Titus et al. | |
| 10,364,735 B2 | 7/2019 | Macfarlane et al. | |
| 10,661,765 B2 | 5/2020 | Butz et al. | |
| 11,602,985 B2 | 3/2023 | Weston et al. | |
| 2011/0204149 A1 | 8/2011 | Prior | |
| 2013/0233658 A1* | 9/2013 | Carmassi | F16D 65/847 |
| | | | 188/264 R |
| 2024/0278637 A1* | 8/2024 | Miyamoto | F16D 65/847 |
| 2024/0392851 A1* | 11/2024 | Makrygiannis | B60T 5/00 |

FOREIGN PATENT DOCUMENTS

| | | | |
|---|---|---|---|
| DE | 3834119 A1 | 4/1990 | |
| DE | 102020112291 A1 | 11/2020 | |

* cited by examiner

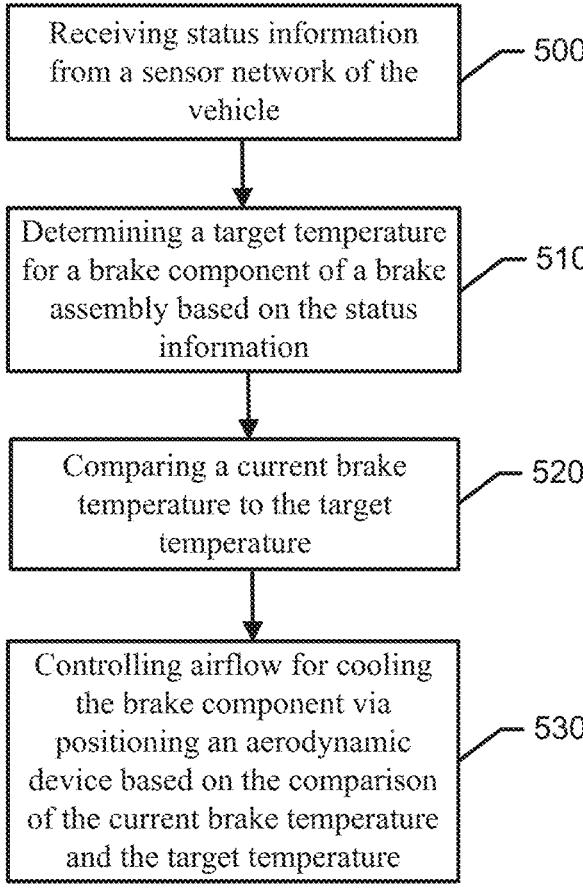

Receiving status information
from a sensor network of the
vehicle ⟶ 500

Determining a target temperature
for a brake component of a brake
assembly based on the status
information ⟶ 510

Comparing a current brake
temperature to the target
temperature ⟶ 520

Controlling airflow for cooling
the brake component via
positioning an aerodynamic
device based on the comparison
of the current brake temperature
and the target temperature ⟶ 530

FIG. 5

GRILL SHUTTER CONTROL FOR BRAKE COOLING

TECHNICAL FIELD

Example embodiments generally relate to vehicle aerodynamics and, more particularly, relate to controllable aerodynamic shutters for cooling brakes based on situational awareness.

BACKGROUND

Vehicles, and especially electric vehicles, may often benefit from good aerodynamic performance. For example, electric vehicles may increase range for a given battery capacity, or may achieve the same range with a smaller battery if aerodynamics are enhanced. Meanwhile, again with further vehicle electrification, electrical componentry contributing to braking torque application is also becoming more common. Whereas air may be used in connection with cooling braking components, such cooling may reduce aerodynamic performance. Thus, it may be desirable to develop an optimal balance between aerodynamic performance and temperature control for brake components.

BRIEF SUMMARY OF SOME EXAMPLES

In accordance with an example embodiment, a vehicle control system for a vehicle may be provided. The system may include a brake assembly for applying negative torque to one or more wheels of the vehicle, a grill shutter assembly that directs airflow over the brake assembly when opened, and prevents airflow toward the brake assembly when closed, and a controller that calculates a target brake temperature, the controller being operably coupled to the grill shutter assembly to control positioning of the grill shutter assembly based on a comparison between a current brake temperature to the target brake temperature.

In another example embodiment, a method of providing selective air cooling to a brake assembly of a vehicle may be provided. The method may include receiving status information from a sensor network of the vehicle, determining a target temperature for a brake component of a brake assembly based on the status information, comparing a current brake temperature to the target temperature, and controlling airflow for cooling the brake component via positioning an aerodynamic device based on the comparison of the current brake temperature and the target temperature.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 5 illustrates a block diagram of a method of providing balance between brake cooling and vehicle aerodynamic performance in accordance with an example embodiment.

DETAILED DESCRIPTION

Figure 1:
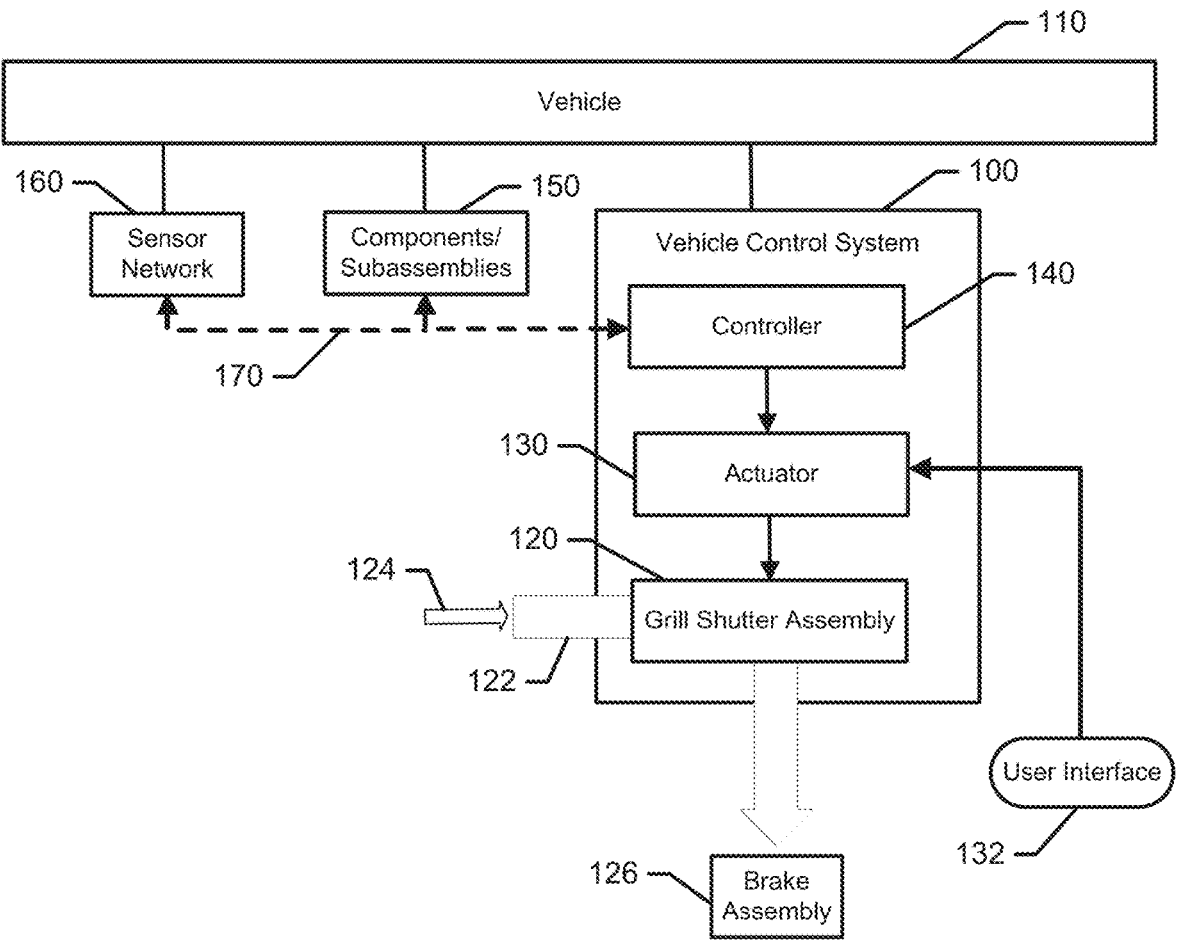
FIG. 1 illustrates a block diagram of a vehicle control system in accordance with an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

Some example embodiments described herein may provide an enhanced system for automated aerodynamic control that balances provision of brake component cooling with aerodynamic performance. Example embodiments effectively aim to keep brake components as cool as possible, whenever possible in light of aerodynamic considerations. In some cases, the control system provided herein may utilize information about vehicle payload, vehicle routing, or other factors regarding the environment that may be known in advance or in real time, and may use such information to define a target temperature below which efforts may be made to keep brake components. When brakes remain cool, aerodynamic performance may be maximized by closing grill shutters to inhibit cooling airflow. However, as brakes heat up, the grill shutters may be opened proportionally until such temperatures reach a level at which fully open shutters may be supplied while reducing aerodynamic performance. Moreover, in challenging situations where higher temperatures are encountered, biasing braking torque application away from friction braking may also be accomplished. Optimizing the balance between component cooling and aerodynamic performance may, for future electric vehicles (EVs), allow enhanced range for a given battery capacity. However, the benefits of optimizing such balance may also extend to internal combustion engine (ICE) vehicles in addition to EVs. As a result, vehicle performance and driver satisfaction may also be elevated.

FIG. 1 illustrates a block diagram of an vehicle control system 100 of an example embodiment. The components of the vehicle control system 100 may be incorporated into a vehicle 110 (e.g., via being operably coupled to a chassis of the vehicle 110 and/or electronic control systems of the vehicle 110). Of note, although the components of FIG. 1 may be connected to the chassis of the vehicle 110, it should be appreciated that such connection may be either direct or indirect. Moreover, some of the components of the vehicle control system 100 may be connected to the vehicle 110 via intermediate connections to other components either of the chassis or of other systems or components.

The vehicle control system 100 may include an grill shutter assembly 120 that may include one or more aerodynamic devices (e.g., a shutter, strake, vent, air guide, or the like) that are movable responsive to control initiated by the vehicle control system 100 while the vehicle 110 is in motion. In its simplest form, the grill shutter assembly 120 may include a single aerodynamic device (e.g., a shutter)

that may be disposed in a passage 122 having a grill formed in a portion of the body of the vehicle 110. The device (e.g., the shutter) may be repositioned within the passage 122 to change the amount of airflow 124 that is enabled to enter the grill and pass through the passage 122. Thus, for example, the shutter may be repositioned to change the device between an open state (where airflow through the passage is maximized) and a closed state (where no airflow 124 is permitted through the passage). Changes between the open state and closed state, as well as changes to the position of the shutter that are intermediate therebetween, may all be considered to be state changes for the grill shutter assembly 120. Thus, for example, the open state may be 100% open, the closed state may be 0% open, and various (or even continuous) positions in between the open and closed states may be included to define respective percentages of open that the shutter may be in each respective position. The vehicle control system 100 may include programming and programmatically controlled physical structures that enable the initiation of changes to the state of the grill shutter assembly 120 based on various conditions or information pertaining to vehicle status, vehicle location, routing, loading, and based on driver or operator control or preferences.

The grill shutter assembly 120 of example embodiments may be dynamic and intelligently controlled. The "intelligently controlled" nature of the grill shutter assembly 120 refers to the fact that automatic adjustments are made to optimize the positioning of the aerodynamic device(s) (e.g., the shutters). The "dynamic" nature of the grill shutter assembly 120 refers to the fact that it is enabled to be dynamically repositioned responsive to real time conditions and status information to actively change the aerodynamic performance of the vehicle 110, while also actively changing the amount of air cooling provided to the brake assembly 126 of the vehicle 110. Thus, for example, when the operator has enabled automatic control of the grill shutter assembly 120 by selecting a mode in which the vehicle control system 100 is operable, the state of the aerodynamic device(s) may be controlled based on status information, current location and various other conditions experienced by the vehicle 110. Thus, for example, various changes in conditions or vehicle status may dynamically cause the state of the aerodynamic device(s) to be changed based on programmed rules or algorithms for control of the grill shutter assembly 120.

In an example embodiment, the vehicle control system 100 may include a repositioning assembly (e.g., actuator 130), which may be provided as part of the vehicle control system 100 in order to reposition or move the grill shutter assembly 120 under the control of a controller 140 (or control module) of the vehicle control system 100. In some cases, the controller 140 may be part of a vehicle dynamic module (VDM) or other control system of the vehicle 110 that is configured to perform other tasks related or not related to aerodynamic control or performance management. However, the controller 140 could be a dedicated or stand-alone controller in some cases. Moreover, in some cases, the controller 140 may be a proportional-integral-derivative (PID) controller.

The operator (or driver) may disable or enable operation of the actuator 130 by using a user interface 132. For example, in one or more modes, the actuator 130 may be disabled, and in one or more other modes, the actuator 130 may be enabled to move under control of the controller 140. As an alternative to having the mode disable or enable the actuator 130 directly, the actuator 130 could be controlled indirectly via the controller 140. Thus, the user interface 132 may interact with the controller 140 instead of the actuator

130 in some cases. The user interface 132 may be internal or external relative to the vehicle 110. Thus, for example, when internal, the user interface 132 may include switches, levers, buttons, a mouse, a touch screen display, or any other suitable human machine interface (HMI). Also as examples, when external, the user interface 132 may be an external control console, a smart phone, or other interface component that can wirelessly communicate with the vehicle 110.

The actuator 130 may include a motion source (e.g., an electric motor, a hydraulic actuator, a pneumatic actuator, or the like) that is operably coupled to the aerodynamic devices (e.g., shutter(s)) of the grill shutter assembly 120 either directly or via linkages that are in turn operably coupled to the aerodynamic devices of the grill shutter assembly 120. Thus, for example, the linkages may include mechanical structures (e.g., hinges, links, arms, rods, shape-changing materials, etc.) that operably couple motion from an output of the motion source to the aerodynamic devices. In cases where the aerodynamic device is a single shutter, one such shutter may be associated with a corresponding instance of the passage 122 leading to each of the rear wheels, and more particularly the rear brakes located at the rear wheels. However, it may also be possible to have four passages with one at each of the front and rear wheels in some cases.

In an example embodiment, the controller 140 may receive information that is used to determine vehicle status (or environmental conditions) and vehicle location from or associated with various components or subassemblies 150 of the vehicle 110. Additionally or alternatively, various sensors that may be operably coupled to the components or subassemblies 150 may be included, and may provide input to the controller 140 that is used in determining vehicle status and location. Such sensors may be part of a sensor network 160 and sensors of the sensor network 160 may be operably coupled to the controller 140 (and/or the components or subassemblies 150) via a vehicle communication bus (e.g., a controller area network (CAN) bus) 170.

The components or subassemblies 150 may include, for example, the brake assembly 126 and/or a wheel assembly of the vehicle 110. Sensors associated with the brake assembly 126 may provide inputs such as brake pedal position, brake torque requests, or brake pressure, to the controller 140. Sensors associated with the wheel assembly may provide information about vehicle speed, wheel angle, etc. Other sensors of the sensor network 160 that may be operably coupled to the brake assembly, the wheel assembly or other parts of the vehicle 110 may provide information relating to brake torque, brake torque rate, vehicle rate of change of speed, individual wheel speeds/angles, etc. Other examples of the components or subassemblies 150 and/or corresponding sensors of the sensor network 160 may provide information relating to pitch, yaw, pitch rate, yaw rate, lateral G force, throttle position, selector button positions associated with chassis and/or vehicle control selections, etc. Thus, for example, the sensors may include an inclinometer, gyroscope, inertial measurement unit, and/or the like. In some cases, the sensor network 160 may further include sensors for detecting weather conditions, road conditions or the like. For example, moisture sensors and temperature sensors may detect wet or icy roads, ambient temperature, brake component temperature, and/or the like.

Road conditions can also be determined using cameras, microphones, rain sensors, and/or the like in some cases. Thus, for example, the sensor network 160 may also include one or more cameras that operate in the visible light spectrum, infrared cameras, Lidar, and/or the like to detect debris or other obstacles or road conditions. In some cases, however, the cameras may also detect location or position relative to a particular characteristic of the road ahead. For example, the cameras may detect a turn or a straightaway and various inclined conditions. Moreover, the cameras may detect a magnitude of the incline, turn or length of the straightaway. In an example embodiment, the cameras may also be capable of comparing image data to previously captured images to determine if the location at which the vehicle 110 currently operates happens to also be a location at which the vehicle 110 had operated in the past. When location correlation occurs, comparisons between prior traversals of the location can be made to determine an optimal setting (or at least a setting to use) for the grill shutter assembly 120 at the location (either currently or in the near future). However, location could alternatively be determined using other means. For example, global positioning system (GPS) data or other location sensors could also or alternatively be employed.

Accordingly, for example, the controller 140 may be able to receive numerous different parameters, indications and other information that may be related to or indicative of different situations or conditions associated with vehicle status. The controller 140 may also receive information indicative of vehicle location. The controller 140 may then be configured to use the information received defining vehicle status and/or location in association with the execution of one or more control algorithms that may be used to provide instructions to the actuator 130 in order to control a state (or positions) of the aerodynamic device or devices of the grill shutter assembly 120.

Figure 2:
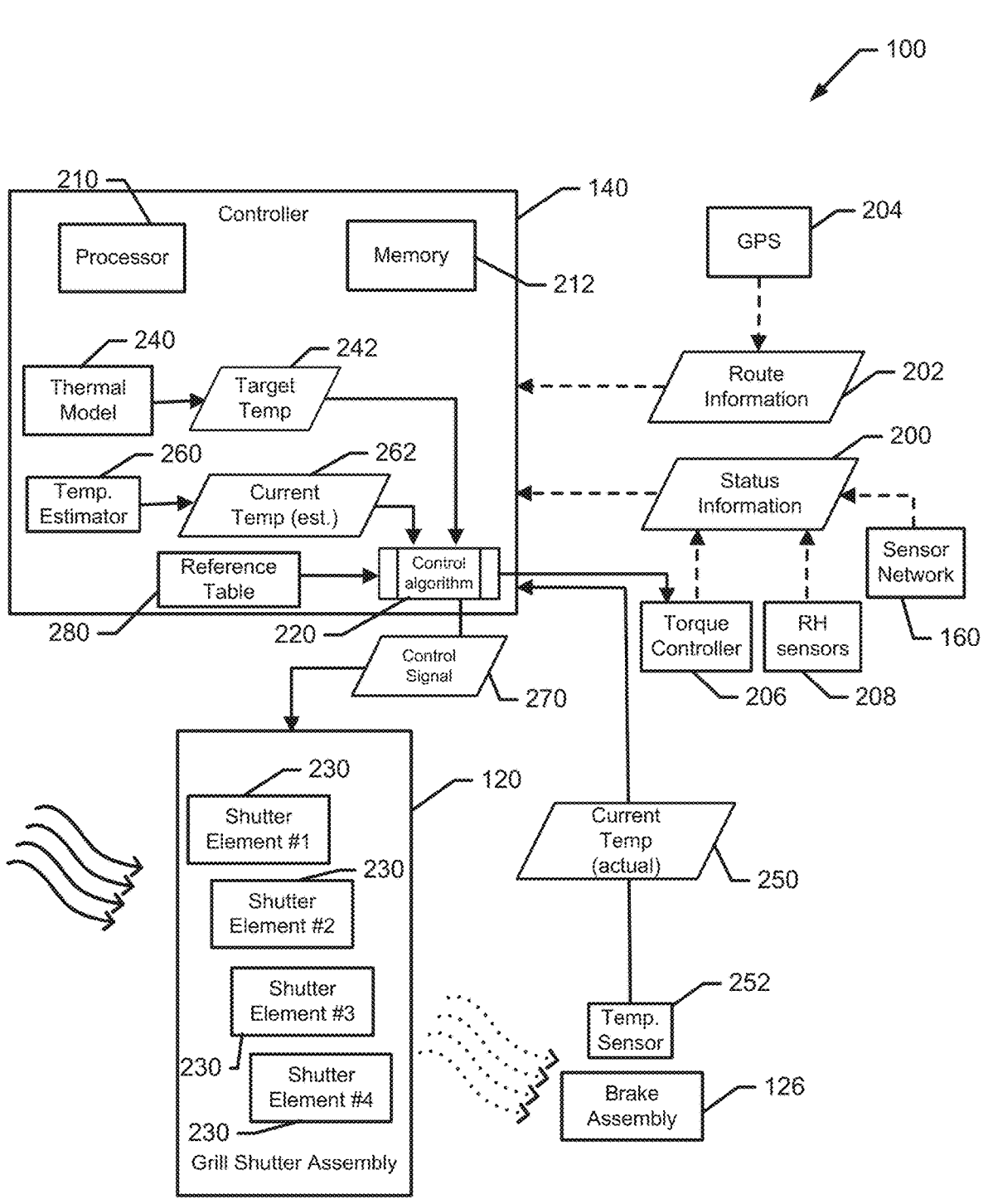
FIG. 2 illustrates a block diagram of some components of an vehicle control system of the vehicle control system of FIG. 1 in accordance with an example embodiment.

FIG. 2 illustrates a block diagram of various components of the vehicle control system 100 of one example embodiment in greater detail. In this regard, for example, the controller 140 may receive status information 200 (e.g., from the sensor network 160) via the vehicle communication bus 170. The status information 200 may include any or all of the types of information described above and/or the like. The controller 140 may also or alternatively receive location information, or more specifically route information 202, from, for example, either or both of a camera (which may obtain image data indicative of various environmental or topographic aspects of the operating environment of the vehicle 110) and a GPS device 204.

The status information 200 may, in some cases, include information about brake torque requests 206, which indicate the amount of negative torque that is being requested for application to wheels of the vehicle 110 using the brake assembly 126. The brake assembly 126 may include friction brakes and in some cases also electromechanical brakes (or other electrically operated braking components). In some examples, brake force distribution may be allocated between electrical and mechanical brake options, as will be discussed in greater detail below. The status information 200 may also include information about the payload or loading of the vehicle 110. Thus, for example, ride height sensors 208 may provide ride height information as a portion of the status information 200 where the ride height information indicates how much loading the vehicle 110 currently carries. Other sensors of the sensor network 160 may also provide other information (e.g., ambient temperature, combined vehicle mass, etc.)

Processing circuitry (e.g., a processor 210 and memory 212) at the controller 140 may process the status information 200 and the location information, or more specifically the route information 202, by running one or more control algorithms. The control algorithms may include instructions that can be stored by the memory 212 for retrieval and execution by the processor 210. In some cases, the memory 212 may further store one or more tables (e.g., look up tables), models, etc., and various calculations and/or applications may be executed using information in the tables or models, the status information 200 and/or the route information 202.

The processor 210 may be configured to execute a control algorithm 220 or multiple instances of the control algorithm 220 in series or in parallel for respective different wheels. Thus, for example, each individual instance of a wheel (and corresponding braking components associated therewith) may have its own control determination made by one instance of the control algorithm 220. Alternatively, one control determination made by the control algorithm 220 may apply to all instances of the wheels and brakes. In FIG. 2, the grill shutter assembly 120 is shown to include four different shutter elements 230 (e.g., shutter element #1, shutter element #2, shutter element #3, and shutter element #4). This arrangement assumes that there are four separate instances of the passage 122 of FIG. 1, associated with each respective one of four wheels of the vehicle 110, and the brake assembly 126 would therefore also include four separate local brake assemblies at each wheel (with such local brake assemblies including friction and/or electrically operable brake components). However, some embodiments may only apply shutters for rear wheels (and corresponding rear brakes). The processor 210 may have a speed and processing power sufficient to ensure that the status information 200 and route information 202 received via the vehicle communication bus 170 are both received and processed in real time (or near real time) to cause corresponding changes to be made to the positioning of the grill shutter assembly 120 (and to specific ones of the shutter elements thereof).

As noted above, the controller 140 may execute one or multiple control algorithms at a time to control the grill shutter assembly 120 in a situationally aware manner. The controller 140 may perform calculations or determinations associated with the control algorithms to ultimately position the shutter elements 230 of the grill shutter assembly 120 in a manner that optimizes cooling of the brake assembly 126 while also considering aerodynamic performance.

The status information 200 may, as noted above, be provided from sensors of the sensor network 160. Inputs such as sound information, moisture data, steering angle, vehicle speed, brake torque requests, wheel speed, ride height, etc., from various components may be included among the status information 200. Meanwhile, the route information 202 (or location information more generally) may be used to determine whether various road segments that are likely to require significant braking are to be encountered along the route, or in the near future. In this regard, the route information 202 may indicate that downhill stretches of road, winding roads, high traffic areas, altitude, towing status, historical driver profile information/behavior, or any other road conditions that typically require increased braking activity are along the route, or in the immediate future path of the vehicle 110.

The controller 140 may receive the status information 200 and the route information 202 to infer, determine or confirm a segment classification, rating or characterization with respect to brake usage over the segment. The classification, rating or characterization may be used either alone or in connection with other status information 200 to provide input to a thermal model 240 that determines a target temperature 242 that may apply for a segment of road, or for a given period of time. The target temperature 242 may define a temperature below which the brake assembly 126 may be considered to be sufficiently cooled that no additional cooling assistance is needed. If the brake assembly 126 (or a portion thereof) exceeds the target temperature 242, then action may be taken to enhance or increase cooling to the brake assembly 126 by opening the grill shutter assembly 120 as described in greater detail below.

In an example embodiment, the thermal model 240 used to determine the target temperature 242 may consider a number of different factors with respect to calculating the target temperature 242. In this regard, for example, high payload, towing, ambient temperature, altitude, inclined surfaces, and the like may all provide inputs to the thermal model 240 to determine the target temperature 242, since each may effect heating or cooling rates for the components of the brake assembly 126. The thermal model 240 may also consider rates of change of temperature to project future temperature spikes based on current and expected rates of increase to change the target brake temperature at various intervals, or when specific stimuli or trigger conditions are encountered. Thus, for example, the target temperature 242 may be set in consideration of a derivative of the temperature rise, distance away from a base set point value otherwise used in determining the target temperature 242, or other real time conditional factors. Moreover, in some cases vehicle-to-vehicle communications (V2V) may be employed to share temperature heating and cooling rates experienced at different locations so that a vehicle approaching a given location can use information already encountered by another vehicle at the location to determine the target temperature 242 to employ for the given location. Historical information associated with the same or other vehicles may also be used, and may be weighted in the calculations of the thermal model 240 based on age or based on other similar conditions to the conditions currently prevalent. Thus, for example, if the weather is different, then less weight may be given to historical information, but if the weather conditions are substantially similar, then more weight may be given to historical information.

Among the status information 200 that may be provided to the controller 140, current brake temperature of the brake assembly 126 (or specific components thereof) may be included. The brake temperature may be an actual current temperature 250, which may be provided by a temperature sensor 252 disposed proximate to each respective braking component (e.g., pads, shoes, calipers, drums, etc.) of the brake assembly 126 to measure such temperature. However, in some cases, either as an alternative to measuring actual temperature, or as a backup, a temperature estimator 260 may be employed to provide an estimated current temperature 262. The temperature estimator 260 may employ a thermal model (e.g., similar to the thermal model 240) that estimates actual temperature (instead of a target or goal temperature) for a given set of input conditions (e.g., obtained from the status information 200 and/or route information 202). Thus, whereas the target temperature 242 defines a goal or threshold temperature above which enhanced cooling is desirable, the estimated current temperature 262 may use a model trained on actual data showing brake temperatures generated in various different driving conditions.

Whether the current temperature value is the actual current temperature 250 or the estimated current temperature 262, the current temperature value may be used by the control algorithm 220 to determine how to control the shutter elements 230 of the grill shutter assembly 120. In this regard, for example, the control algorithm 220 may compare the current temperature value to the target temperature 242 to make determinations regarding control of the grill shutter assembly 120. Moreover, in some cases, multiple different trigger, threshold, or set point temperature values may be defined for various different corresponding actions by the controller 140 via the control algorithm 220. Based on the determination made, the control algorithm 220 may then generate a control instruction 270 to reposition the grill shutter assembly 120.

In an example embodiment, the control algorithm 220 may include tables of values or positions for the shutter elements 230, where the tables are entered using specific vehicle parameters (e.g., speed, brake torque, current brake temperature, road segment characterizations, loading information, altitude, etc.). Various other vehicle parameters may be entry values into such tables or may be weighting factors, or modifiers to either the table entry values or the resulting values or positions of the shutter elements 230. For example, ride height, yaw rate, tire age, wheel diameter, vehicle weight, and/or the like may be modifiers in the manner described above. Calculations may also consider various vehicle status conditions (e.g., weight, weight distribution, passengers, loading, fuel status, tire condition, etc.) and weather conditions (e.g., ambient external vehicle temperature, wet roads, icy roads, etc.) to tailor handling to the conditions of the road surface at any given time. Moreover, the control algorithm 220 may include iterative strategies for achieving target setting in real time.

In some embodiments, the control algorithm 220 may reference a reference table 280, which may include correction factors to apply to temperature estimates (as opposed to actual temperature measurements). The reference table 280 may include corrections based on any of the status information 200 that may be provided, or may be a fixed value that provides a buffer against the potential for inaccuracies in estimations that may be made by the temperature estimator 260. However, in some embodiments, the reference table 280 may also (or alternatively) be used to record data for the application of machine learning to better performance of the system over time. Thus, for example, a neural network or other machine learning module may be employed in connection with the reference table 280 to allow the estimations of the temperature estimator 260 to be bettered over time, particularly if actual data can be compared to estimated values over time to increase the accuracy of model performance over time.

Figure 3:
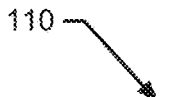
FIG. 3 illustrates a perspective view of a vehicle with a grill shutter assembly in accordance with an example embodiment.
Figure 3:
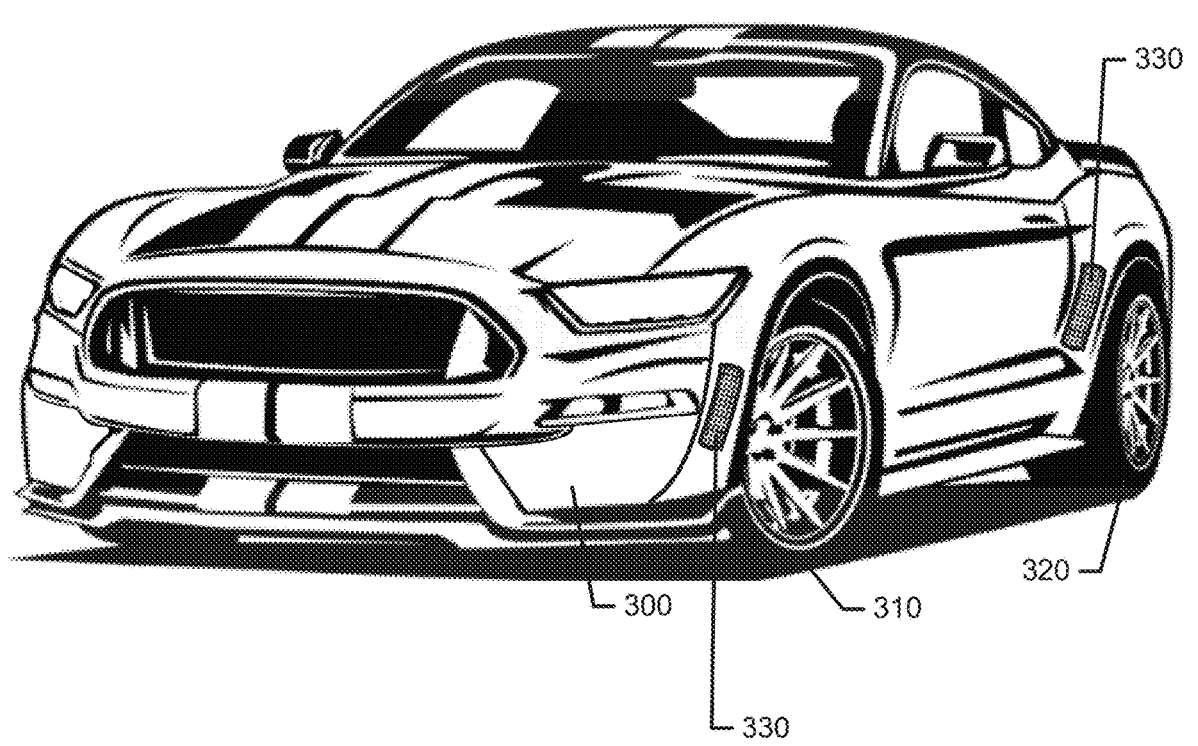

FIG. 3 shows a perspective view of one potential embodiment of the vehicle 110 of FIG. 1. In this regard, the vehicle 110 may include a body 300 that is attached to the chassis of the vehicle 110. Front wheels 310 and rear wheels 320 may be operably coupled to the chassis and a grill portion 330 of the grill shutter assembly 120 of FIG. 1 may be disposed at portions of the body 300 that are proximate to (and forward of) each respective one of the front wheels 310 and/or rear wheels 320. The grill portion 330 may, in some cases, be conformal with the body 300 and direct air toward the shutters (e.g., shutter elements 230) in respective passages that further direct the air toward individual brake components of the brake assembly 126. Although FIG. 3 shows front and rear wheels 310 and 320 each including instances of the grill portion 330 associated therewith, it may be possible for only the front wheels 310 or only the rear wheels 320 to have brake cooling as described herein in some cases.

Figure 4:
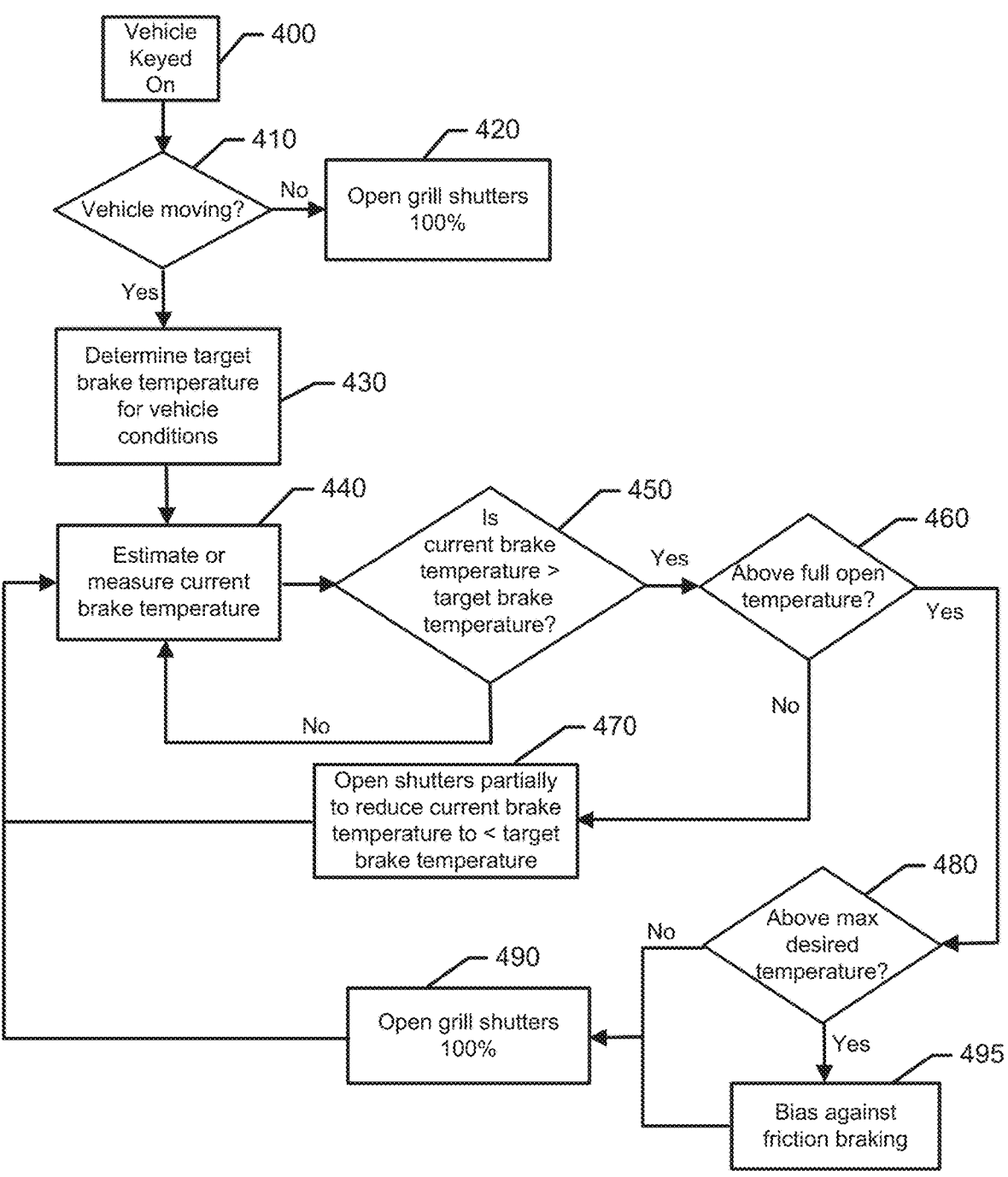
FIG. 4 illustrates a block diagram of a control algorithm for controlling a grill shutter assembly disposed on the vehicle in accordance with an example embodiment.

FIG. 4 illustrates a block diagram showing operations that may be associated with the control algorithm of an example embodiment. In this regard, the vehicle may initially be keyed on at operation 400, and a determination may be made at operation 410 as to whether the vehicle is moving. If the vehicle is not moving (i.e., is parked), the grill shutters may be fully opened at operation 420. In this regard, since the vehicle is not moving, airflow and the cooling associated therewith can be permitted without any effect on vehicle aerodynamics. However, it should be appreciated that in some cases, it may be desirable to close the grill shutters even when not moving, such as when certain weather conditions exist. For example, if it is raining or snowing, it may be desirable to fully close the grill shutters when the vehicle is not moving (and potentially moving as well) if, for example, the brakes are not above a calibrated threshold temperature. Meanwhile, if the vehicle is moving, then balancing considerations of cooling and aerodynamics may be accomplished and, at operation 430, a target brake temperature may be determined for vehicle conditions (e.g., indicated by the status information 200 and the route information 202). The estimated or actual current temperature may be measured at operation 440 and then a determination may be made at operation 450 as to whether the current brake temperature (estimated or actual) is greater than the target brake temperature. If the current brake temperature is not greater than the target brake temperature, then there may be no need to increase cooling via airflow directed toward brake system components, and flow may return to operation 440. However, if current brake temperature is greater than the target brake temperature, then some action to increase cooling may be desired.

Accordingly, at operation 460, another determination may be made in terms of comparing the current brake temperature to another threshold or set point, which in this case may be a full open temperature set point. If the current brake temperature is not greater than the target brake temperature and the full open temperature at operation 460, then the grill shutters may be opened partially in order to reduce the current brake temperature to less than the target brake temperature at operation 470. After operation 470, flow may return to operation 440.

If instead the current brake temperature is both above the target brake temperature and the full open temperature, then a further determination may be made at operation 480 as to whether the temperature is also above a maximum desired temperature. The maximum desired temperature may be a value that is within a buffer amount of the maximum design temperature for the corresponding brake component. If the temperature is not above the maximum desired temperature, then the shutters may remain fully open at operation 490 before flow returns back to operation 440 for continued monitoring. However, if the current brake temperature is above the maximum desired temperature, then friction braking may be derated at operation 495. The derating of friction braking may effectively mean that biasing is inserted into the brake allocations normally made between frictional sources and non-frictional sources (e.g., regenerative braking) to bias against friction braking. This means that future brake torque requests will be fulfilled more proportionally via non-frictional (and therefore less heat inducing) braking means.

When the vehicle 110 approaches its final destination (e.g., either a geo-fenced area around the final destination, or within a given distance of the final destination), it may be desirable to initiate different target temperatures. In this regard, since the vehicle 110 will presumably be parked soon, it may be desirable to increase cooling (and decrease brake temperatures) before the vehicle 110 is parked and the parking brake is applied. Accordingly, in some cases, the target temperature 242 may be reduced when nearing the final destination (e.g., if known from the route information 202). Because electromechanical brakes are sometimes also used as parking brakes, as the brakes cool, the brake shoes may need to be adjusted to ensure that the parking brake is set appropriately. By commanding a lower temperature before parking, the time that the vehicle 110 needs to be awake to monitor brake temperatures and/or make brake adjustments associated with cooling components may be minimized or at least reduced. As noted above, altitude may also factor into target temperature setting since cooling is slower at higher altitudes.

Other modifications to the normal operation of the control algorithm 220 operation of FIG. 4 may also be possible. For example, when aggressive braking occurs, when winding roads are approached, high traffic areas are reached, or large inclines are encountered or about to be encountered, the brake shutters may be opened preemptively, and before temperatures are allowed to increase to reach the target temperature 242.

FIG. 5 illustrates a block diagram of a method of providing selective air cooling to a brake assembly of a vehicle. The method may include receiving status information from a sensor network of the vehicle at operation 500 and determining a target temperature for a brake component of a brake assembly based on the status information at operation 510. The method may further include comparing a current brake temperature to the target temperature at operation 520, and controlling airflow for cooling the brake component via positioning an aerodynamic device based on the comparison of the current brake temperature and the target temperature at operation 530. In some cases, the target brake temperature may be determined based on a thermal model that determines the target temperature based on route information defining a future route of the vehicle. In an example embodiment, the target brake temperature may be determined based on a thermal model that determines the target temperature based on the status information including vehicle loading information indicated by ride height sensors. In some cases, controlling the airflow may include at least partially opening the aerodynamic device responsive to the current brake temperature being higher than the target temperature, modulating a degree to which the aerodynamic device is open to maintain the current brake temperature lower than the target temperature, and fully opening the aerodynamic device responsive to the current brake temperature being higher than the target temperature and a full open threshold temperature. In an example embodiment, controlling the airflow further includes biasing fulfillment of brake torque requests away from usage of friction brakes responsive to the current brake temperature being higher than the target temperature, the full open threshold temperature, and a maximum desirable temperature. In some cases, the current brake temperature may be an estimated current brake temperature generated based on a thermal model or an actual current brake temperature measured via a temperature sensor disposed proximate to the brake assembly.

Accordingly, a vehicle control system for a vehicle may be provided, and in some cases the vehicle control system may more specifically be an aerodynamics control system and/or a brake temperature control system. The system may include a repositionable aerodynamic device disposed at a portion of the vehicle that is controllable to balance aerodynamic efficiency with brake cooling capacity. Moreover, in some cases, the system may include a brake assembly for applying negative torque to wheels of the vehicle, a grill shutter assembly that directs airflow over the brake assembly when opened, and prevents airflow toward the brake assembly when closed, and a controller that calculates a target brake temperature, the controller being operably coupled to the grill shutter assembly to control positioning of the grill shutter assembly based on a comparison between a current brake temperature to the target brake temperature.

The system of some embodiments may include additional features, modifications, augmentations and/or the like to achieve further objectives or enhance performance of the system. The additional features, modifications, augmentations and/or the like may be added in any combination with each other. Below is a list of various additional features, modifications, and augmentations that can each be added individually or in any combination with each other. For example, the current brake temperature may be an estimated current brake temperature generated based on a thermal model. In an example embodiment, the thermal model may generate the estimated current brake temperature based on input status information including a friction brake torque request, vehicle speed, ambient temperature, wheel radius and altitude. In some cases, the current brake temperature may be an actual current brake temperature measured via a temperature sensor disposed proximate to the brake assembly. In an example embodiment, the target brake temperature may be determined based on a thermal model. In some cases, the thermal model may determine the target brake temperature based on route information defining a future route of the vehicle. In an example embodiment, the thermal model may determine the target brake temperature based on status information including vehicle loading information indicated by ride height sensors. In some cases, the vehicle loading information may be indicated by ride height sensors or user input defining a towing status of the vehicle. In an example embodiment, the brake assembly may include brakes at rear wheels of the vehicle, and the grill shutter assembly may include a grill disposed in a vehicle body portion proximate each respective one of the rear wheels of the vehicle and a moveable shutter associated with each instance of the grill. In some cases, the controller may at least partially open the grill shutter assembly responsive to the current brake temperature being higher than the target brake temperature. In an example embodiment, the controller modulates a degree to which the grill shutter assembly is open to maintain the current brake temperature lower than the target brake temperature. In some cases, the controller may fully open the grill shutter assembly responsive to the current brake temperature being higher than the target brake temperature and a full open threshold temperature. In an example embodiment, the controller may bias fulfillment of brake torque requests toward a different braking source, which may generally be away from usage of friction brakes in some cases, or may be to other friction brakes in others, responsive to the current brake temperature being higher than the target brake temperature, the full open threshold temperature, and a maximum desirable temperature. In an example embodiment, the controller may employ machine learning to modify a control algorithm used to determine the target brake temperature. In some cases, the target temperature may be modified based on proximity to a final location associated with a route of the vehicle.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A vehicle control system, the system comprising:
   a brake assembly for applying negative torque to one or more wheels of the vehicle;
   a grill shutter assembly that directs airflow over the brake assembly when opened, and prevents airflow toward the brake assembly when closed; and
   a controller that calculates a target brake temperature, the controller being operably coupled to the grill shutter assembly to control positioning of the grill shutter assembly based on a comparison between a current brake temperature to the target brake temperature,
   wherein the target brake temperature is modified based on proximity to a final location associated with a route of the vehicle.

2. The system of claim 1, wherein the current brake temperature is an estimated current brake temperature generated based on a thermal model.

3. The system of claim 2, wherein the thermal model generates the estimated current brake temperature based on input status information including a friction brake torque request, vehicle speed, ambient temperature, wheel radius and altitude.

4. The system of claim 1, wherein the current brake temperature is an actual current brake temperature measured via a temperature sensor disposed proximate to the brake assembly.

5. The system of claim 1, wherein the target brake temperature is determined based on a thermal model.

6. The system of claim 5, wherein the thermal model determines the target brake temperature based on route information defining a future route of the vehicle.

7. The system of claim 5, wherein the thermal model determines the target brake temperature based on status information including vehicle loading information indicated by ride height sensors.

8. The system of claim 7, wherein the vehicle loading information is indicated by ride height sensors or user input defining a towing status of the vehicle.

9. The system of claim 1, wherein the brake assembly comprises brakes at rear wheels of the vehicle, and
   wherein the grill shutter assembly comprises a grill disposed in a vehicle body portion proximate each respective one of the rear wheels of the vehicle and a moveable shutter associated with each instance of the grill.

10. The system of claim 1, wherein the controller at least partially opens the grill shutter assembly responsive to the current brake temperature being higher than the target brake temperature.

11. The system of claim 10, wherein the controller modulates a degree to which the grill shutter assembly is open to maintain the current brake temperature lower than the target brake temperature.

12. The system of claim 10, wherein the controller fully opens the grill shutter assembly responsive to the current brake temperature being higher than the target brake temperature and a full open threshold temperature.

13. The system of claim 12, wherein the controller biases fulfillment of brake torque requests toward a different braking source responsive to the current brake temperature being higher than the target brake temperature, the full open threshold temperature, and a maximum desirable temperature.

14. The system of claim 12, wherein the controller employs machine learning to modify a control algorithm used to determine the target brake temperature.

15. A method of providing selective air cooling to a brake assembly of a vehicle, the method comprising:

receiving status information from a sensor network of the vehicle;

determining a target temperature for a brake component of a brake assembly based on the status information;

comparing a current brake temperature to the target temperature; and controlling airflow for cooling the brake component via positioning an aerodynamic device based on the comparison of the current brake temperature and the target temperature, wherein the target brake temperature is determined based on a thermal model that determines the target temperature:

based on route information defining a future route of the vehicle, or based on the status information including vehicle loading information indicated by ride height sensors.

16. The method of claim 15, wherein controlling the airflow comprises at least partially opening the aerodynamic device responsive to the current brake temperature being higher than the target temperature, modulating a degree to which the aerodynamic device is open to maintain the current brake temperature lower than the target temperature, and fully opening the aerodynamic device responsive to the current brake temperature being higher than the target temperature and a full open threshold temperature.

17. The method of claim 16, wherein controlling the airflow further comprises biasing fulfillment of brake torque requests toward a different braking source responsive to the current brake temperature being higher than the target temperature, the full open threshold temperature, and a maximum desirable temperature.

18. The method of claim 15, wherein the current brake temperature is an estimated current brake temperature generated based on a thermal model or an actual current brake temperature measured via a temperature sensor disposed proximate to the brake assembly.

19. A vehicle control system, the system comprising:

a brake assembly for applying negative torque to one or more wheels of the vehicle;

a grill shutter assembly that directs airflow over the brake assembly when opened, and prevents airflow toward the brake assembly when closed; and a controller that calculates a target brake temperature, the controller being operably coupled to the grill shutter assembly to control positioning of the grill shutter assembly based on a comparison between a current brake temperature to the target brake temperature, wherein the target brake temperature is determined based on a thermal model, and wherein the thermal model determines the target brake temperature based on route information defining a future route of the vehicle or based on status information including vehicle loading information indicated by ride height sensors.

* * * * *